(12) United States Patent
Quindt (10) Patent No.: US 7,581,776 B2
(45) Date of Patent: Sep. 1, 2009

(54) CONVERTIBLE TOP HAVING OVER CENTER LINKAGE

(75) Inventor: Reinhard Wolfgang Quindt, Novi, MI (US)

(73) Assignee: Wilhelm Karmann GmbH, Osnabruck (DE)

( * ) Notice: Subject to any disclaimer, the term of this patent is extended or adjusted under 35 U.S.C. 154(b) by 0 days.

(21) Appl. No.: 12/094,741

(22) PCT Filed: Nov. 22, 2006

(86) PCT No.: PCT/US2006/045188

§ 371 (c)(1),
(2), (4) Date: May 22, 2008

(87) PCT Pub. No.: WO2007/062109

PCT Pub. Date: May 31, 2007

(65) Prior Publication Data

US 2008/0265612 A1    Oct. 30, 2008

Related U.S. Application Data

(60) Provisional application No. 60/739,655, filed on Nov. 23, 2005.

(51) Int. Cl.
*B60J 7/12* (2006.01)

(52) U.S. Cl. ............................ 296/107.12; 296/107.09; 296/117

(58) Field of Classification Search ............ 296/107.01, 296/116, 117, 107.07, 107.08, 107.12, 107.09
See application file for complete search history.

(56) References Cited

U.S. PATENT DOCUMENTS

| 286,272 A | 10/1883 | Davis |
| 2,560,496 A | 7/1951 | Vigmostad |
| 4,720,133 A | 1/1988 | Alexander et al. |
| 5,749,619 A | 5/1998 | Mentink |
| 5,816,644 A | 10/1998 | Rothe et al. |
| 6,048,021 A * | 4/2000 | Sautter, Jr. .................. 296/117 |
| 6,729,673 B2 | 5/2004 | Hahn et al. |
| 2003/0057728 A1 | 3/2003 | Sims |
| 2004/0012222 A1 | 1/2004 | Hollenbeck et al. |
| 2007/0152469 A1 | 7/2007 | Papendorf et al. |

* cited by examiner

*Primary Examiner*—Joseph D Pape
(74) *Attorney, Agent, or Firm*—Gifford, Krass, Sprinkle, Anderson & Citkowski, P.C.

(57) ABSTRACT

A retractable top is movable between an extended position and a retracted position. The top includes a roof cover, a linkage mechanism, a rear bow and an overcenter linkage. The linkage mechanism is pivotally coupled to the vehicle. The rear bow is pivotally coupled to the vehicle. The linkage mechanism supports a front portion of the roof cover. The rear bow supports a rear end of the roof cover. The overcenter linkage extends between the linkage mechanism and the rear bow. The overcenter linkage is movable to an overcenter position for locking the rear bow in the extended position.

9 Claims, 8 Drawing Sheets

CONVERTIBLE TOP HAVING OVER CENTER LINKAGE

REFERENCE TO RELATED APPLICATIONS

This application claims priority to PCT/US2006/045188, filed Nov. 22, 2006, which claims priority from U.S. provisional patent application No. 60/739,655, which was filed Nov. 23, 2005 and is incorporated herein by reference in its entirety.

FIELD OF THE INVENTION

The invention relates to a convertible top for an automotive vehicle. More specifically, the invention relates to an overcenter linkage arrangement that helps to maintain the top in an extended position.

BACKGROUND OF THE INVENTION

Convertible vehicles have tops that are movable between an extended position covering a passenger compartment and a retracted position disposed within a storage space, typically in a rear portion of the vehicle. A convertible top typically includes a linkage mechanism that provides support to the top and also allows the movement of the top between the extended and retracted positions. Optionally, drive mechanisms or actuators are used for automating the movement of the top between the extended and retracted positions.

Convertible tops have roof covers that are soft, rigid or a combination thereof. In soft top designs, a rear bow is typically used to support a rear edge of the roof cover and to move the rear edge of the roof cover between the extended and retracted positions. In conventional convertible top designs, it is not difficult for one to forcibly lift the rear bow from the extended position to gain access to the passenger compartment. This poses a potential security issue. Thus, it remains desirable to design a convertible top with a rear bow design that improves over conventional convertible tops by making it difficult to lift the rear bow from the extended position.

SUMMARY OF THE INVENTION

According to one embodiment of the invention, a retractable top is provided for a motor vehicle having a passenger compartment and a storage space located behind the passenger compartment, wherein the top is movable between an extended position covering the passenger compartment and a retracted position disposed in the storage space. The top includes a linkage mechanism, a rear bow, a roof cover, an overcenter linkage and an actuator. The linkage mechanism is pivotally coupled to the vehicle. The rear bow is pivotally coupled to the vehicle. The roof cover has a forward portion supported by the linkage mechanism and a rear end interconnected with the rear bow. The overcenter linkage has first and second overcenter links that extend between the rear bow and the linkage mechanism. The overcenter linkage is movable to an overcenter position to retain the rear bow in the extended position. The actuator is directly pivotally coupled to one of the front and rear overcenter links for actuating the overcenter linkage into and out of the overcenter position.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE PREFERRED EMBODIMENTS

Referring to the figures, a convertible top for a motor vehicle is generally indicated at 10. The top 10 includes a roof cover 5, a rear bow 30 for supporting a rear end of the roof cover 5 and a linkage mechanism 12 for supporting the portion of the roof cover forward of the rear end. The linkage mechanism 12 and rear bow 30 provide movement of the cover 5 between an extended position covering a passenger compartment and a retracted position disposed in a storage compartment located behind the passenger compartment. Described in greater detail below, an overcenter linkage is operatively coupled between the linkage mechanism 12 and the rear bow 30 for providing movement of the rear bow 30 between the extended and retracted positions and for locking the rear bow 30 in the extended position.

The linkage mechanism 12 is secured to the vehicle by a main bracket 13. The linkage mechanism 12 includes a front rail 31 (see FIG. 7), a middle rail 28 and a rear link 14. The rear link 14 has opposite top 20 and bottom 22 ends. The bottom end 22 of the rear link 14 is directly pivotally coupled to the vehicle via the main bracket 13. The rear link 14 may also be coupled to the vehicle by a multi-link mechanism, such as a four-bar linkage. The top end 20 of the rear link 14 is pivotally coupled to the middle rail 28. The middle rail 28 is also pivotally coupled to the front rail 31. The linkage mechanism 12 also includes a pair of links 29, 35 coupled between the front 31 and middle 28 rails to form a four-bar linkage therewith.

The rear bow 30 includes an inner end 32 and an outer end 34. The inner end 32 is pivotally coupled to a rocker 36, which in turn is directly pivotally coupled to the vehicle via the main bracket 13. The outer end 34 supports a rear end of the top 10. Optionally, the rear bow is directly pivotally coupled to the vehicle.

The overcenter linkage extends between the rear bow 30 and the link 29 from the four-bar linkage connecting the front 31 and middle rails 28. More specifically, the overcenter linkage includes a rear overcenter link 16 and a front overcenter link 18. Each overcenter link 16, 18 has opposite first 40, 42 and second 44, 43 ends. The first end 40 of the rear overcenter link 16 is pivotally coupled to the rear bow 30 by a first pivot 46. The first end 42 of the front overcenter link 18 is pivotally coupled to a coupling bracket 50 via a second pivot 52. An intermediate link 48 extends between one end pivotally coupled to the coupling bracket 50 and an opposite end pivotally coupled to a rear end of a middle link 26. The middle link 26 has a front end pivotally coupled to the link 29. The second ends 44, 43 of the overcenter links 16, 18 are pivotally coupled to each other by a third pivot 58. Alternatively, the overcenter linkage may be coupled between the rear bow and other members of the linkage mechanism 12, such as the rear link 14, with appropriate modifications to the overall system.

The coupling bracket 50 maintains the front overcenter link 18 and the intermediate link 48 in substantially the same relative orientation during movement of the top 10 between the extended and retracted positions. In the extended position, however, the coupling bracket 50 allows slight counterclockwise movement of the front overcenter link 18 relative to the intermediate link 48 and coupling bracket 50, such that in the extended position, the third pivot 58 is positioned "overcenter" or above an overcenter line A-A connecting the first 46 and second 52 pivots. By this arrangement, the third pivot 58 is movable to an overcenter position above the overcenter line A-A. In this position, the overcenter links 16, 18 are locked end to end to maintain the rear bow 30 in the extended position. Optionally, mechanical stops may be formed in the overcenter links near the third pivot to prevent over rotation of the overcenter links beyond the overcenter position when the top is actuated to the extended position.

Figure 1:
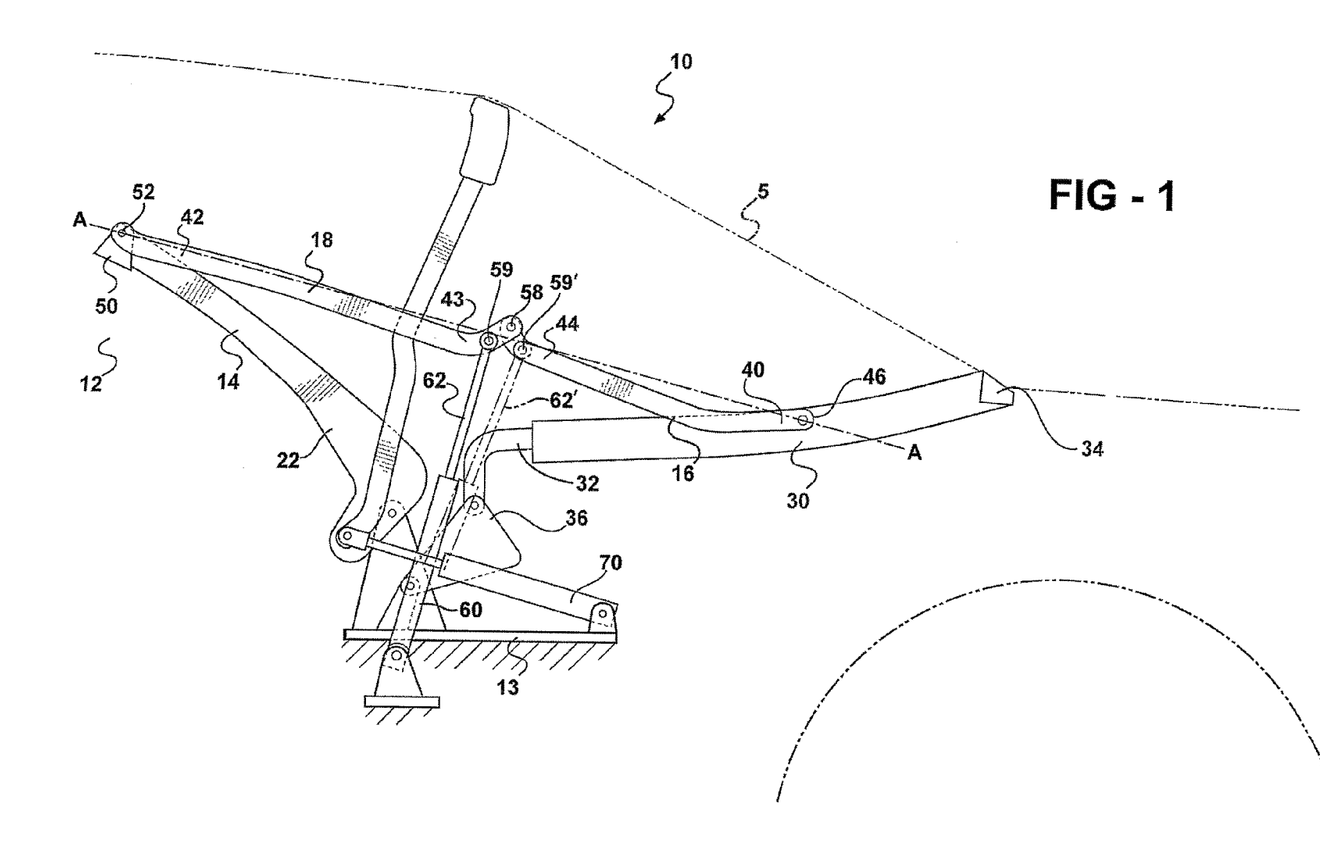
FIG. 1 is a side elevational view of a convertible top according to an embodiment of the invention shown in an extended position.
Figure 2:
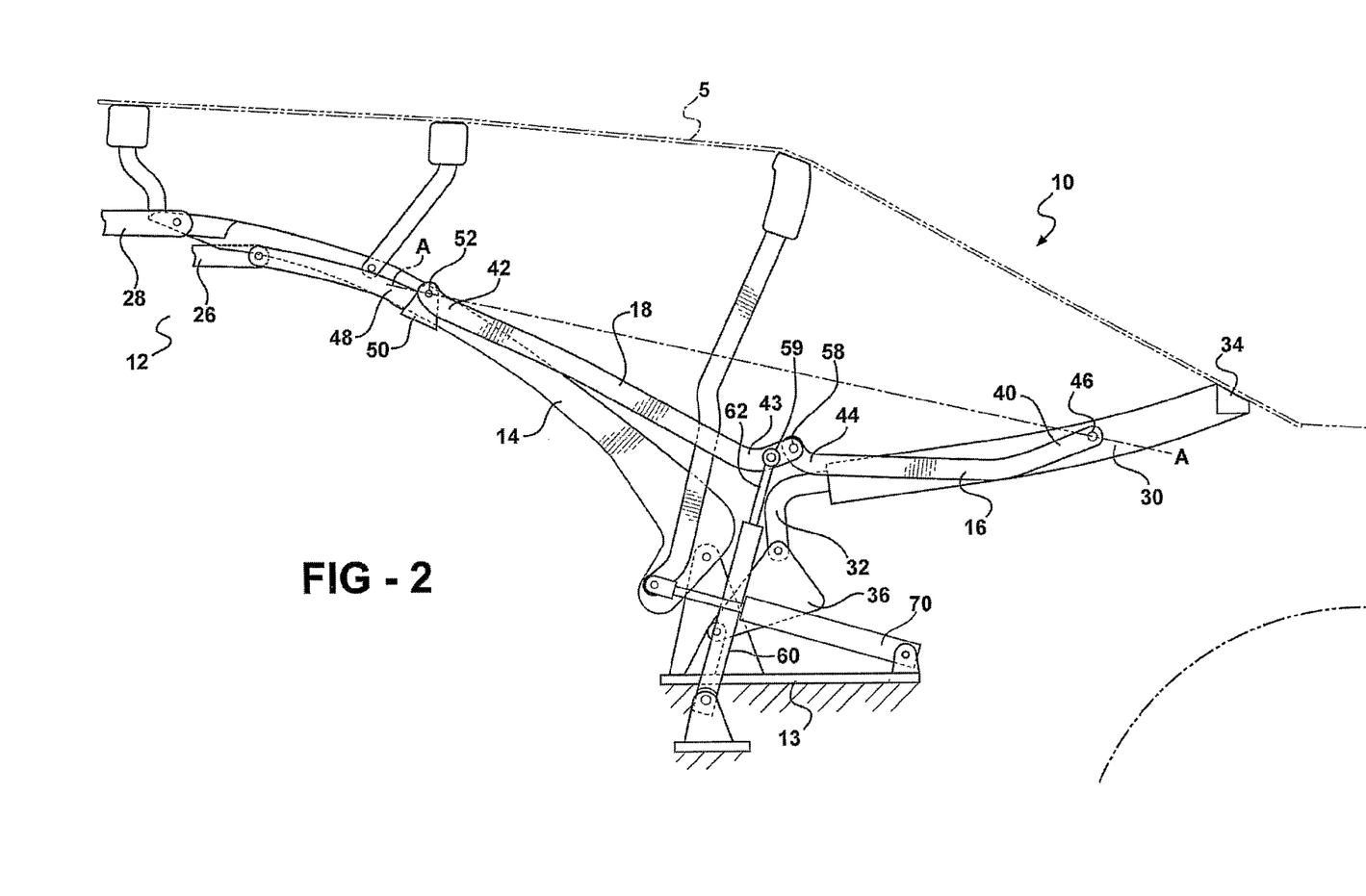
FIGS. 2-7 are side elevational views of the convertible top shown in intermediate positions between the extended position and a retracted position.
Figure 3:
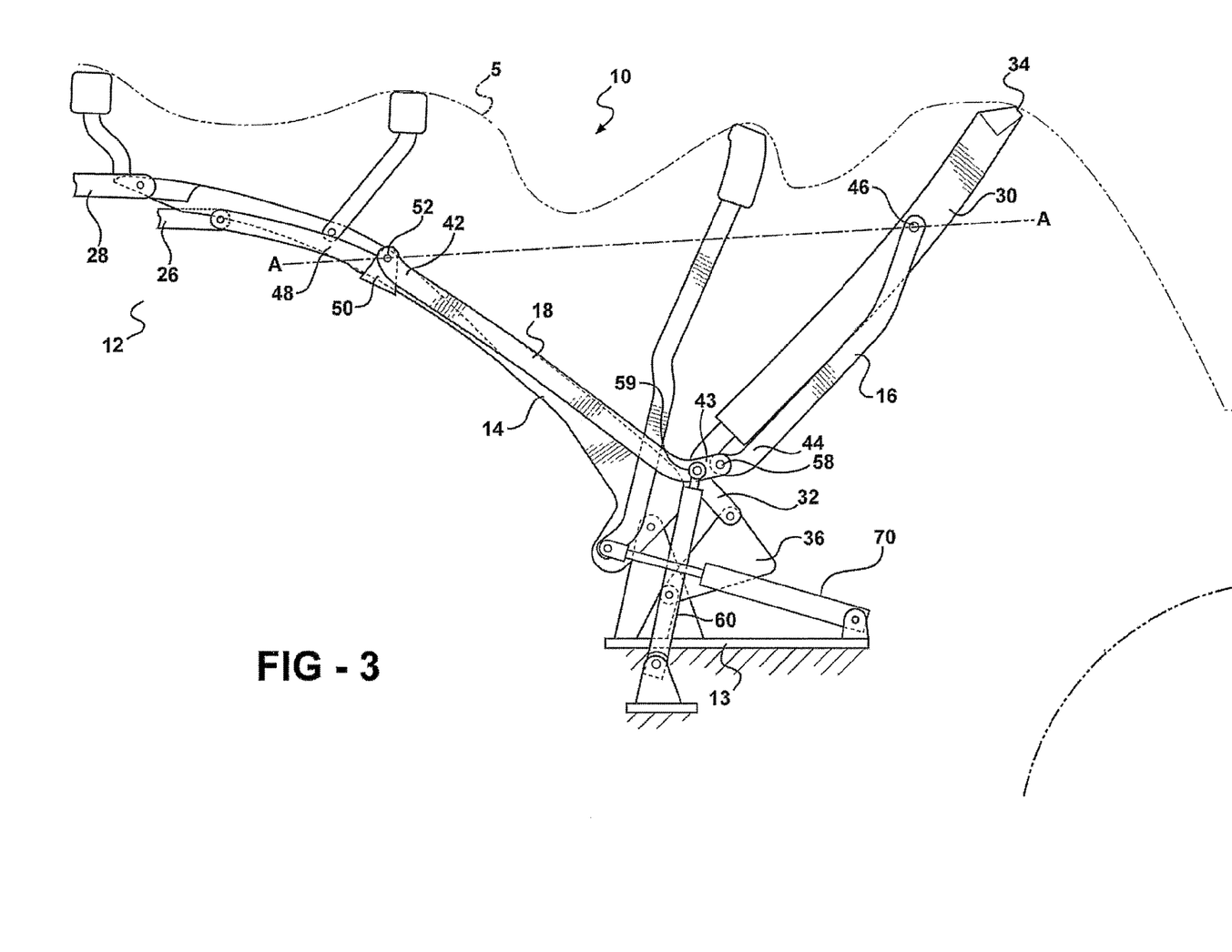

An actuator 60 in the form of a hydraulic linear actuator drives the overcenter linkage 16, 18 by moving the third pivot 58 above and below the overcenter line A-A when the top is being moved into and out of the extended position. A driven rod 62 from the actuator 60 is pivotally coupled to one of the overcenter links 16, 18 at a point adjacent to the third pivot 58. In the illustrated embodiment, the actuator 60 is directly pivotally coupled to the front overcenter link 16 at a fourth pivot 59, which is adjacent to the third pivot 58. Alternatively, as shown in FIG. 1, the driven rod 62' may be directly pivotally coupled to the rear overcenter link 16 to define the fourth pivot 59'. A second actuator 70 in the form of a hydraulic linear actuator is operatively coupled to rear link 14 for actuating the top between the extended and retracted positions.

Figure 4:
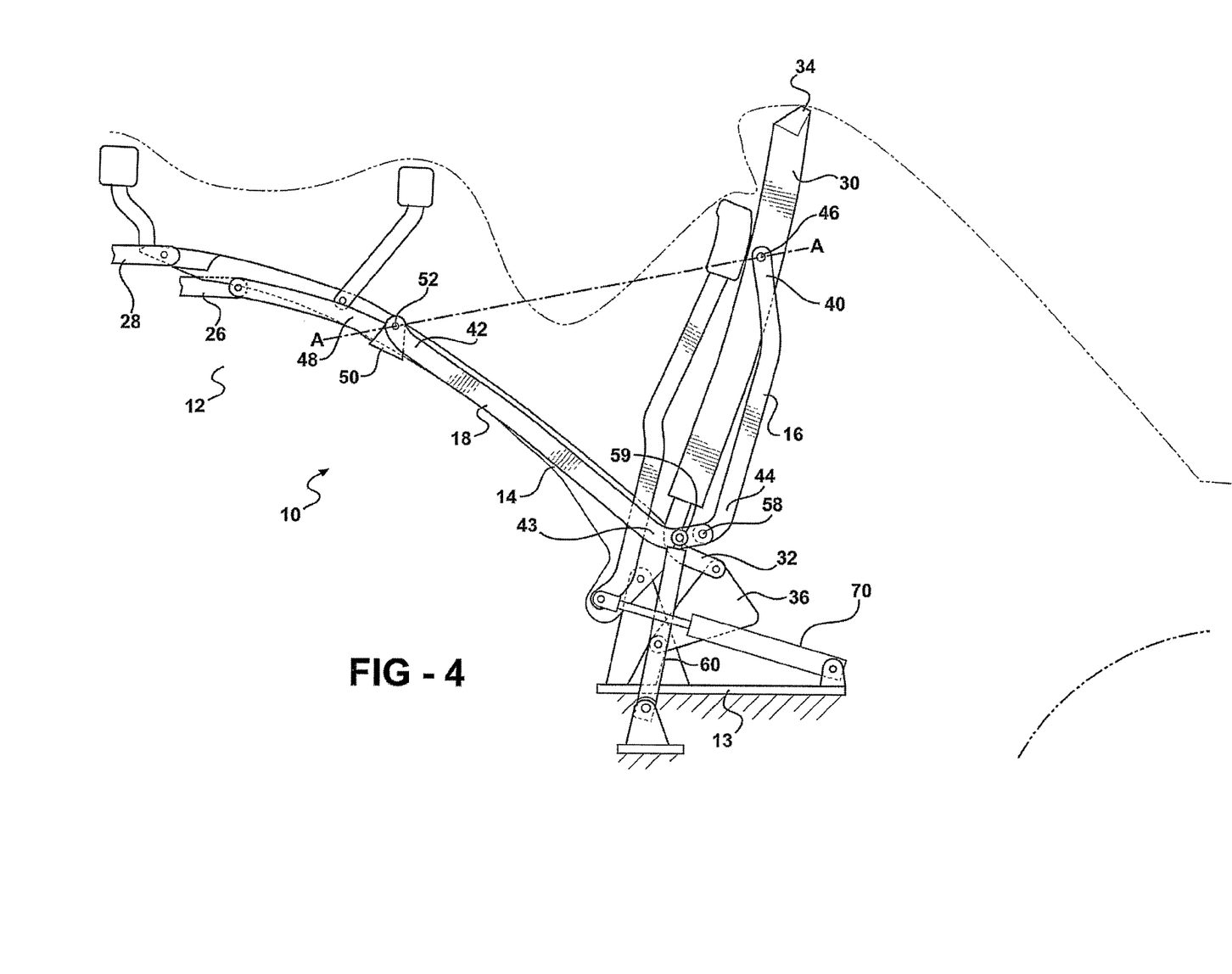
Figure 8:
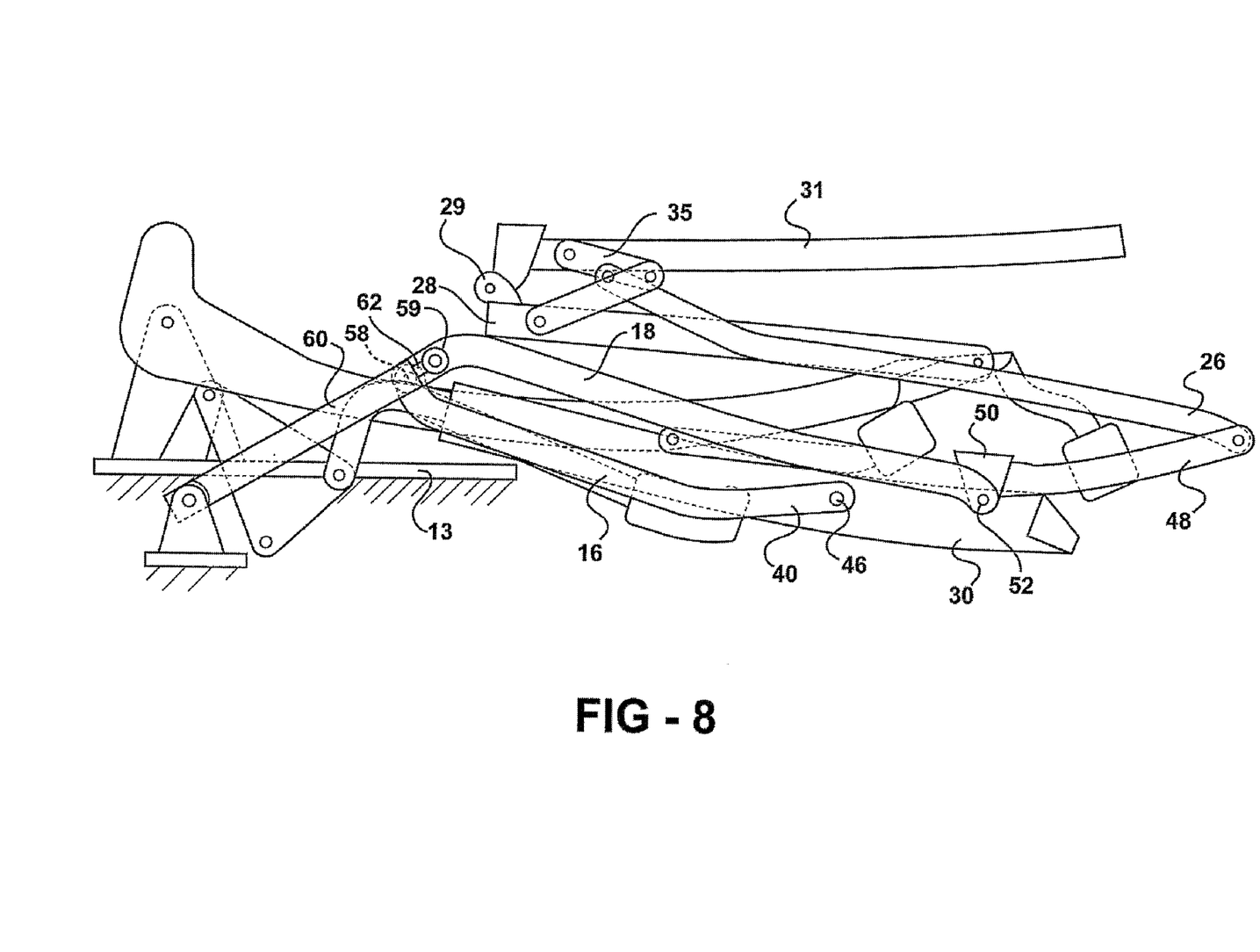
FIG. 8 is a side elevational view of the convertible top shown in the retracted position.

In use, the overcenter linkage 16, 18 with the pivot 58 in the overcenter position above the overcenter line A-A helps maintain the top 10 in the extended position. The pivot 58 must be moved below the overcenter line A-A to allow the actuator 70 to move the top from the extended position in FIG. 1 to the retracted position in FIG. 8. The actuator 60 pulls the driven rod 62 downwardly as viewed in the figures. The second ends 44, 43 of the front 18 and rear 16 overcenter links are pulled downwardly with the driven rod 62. At the same time, the third pivot 58 is pulled below the overcenter line A-A or below the overcenter position. The front overcenter link 18 pivots clockwise about the second pivot 52. As shown in FIG. 4, the rear bow 30 and the rear overcenter link 16 pivot counterclockwise to a substantially upright position relative to the rocker 36 and the third pivot 58, respectively. At this point, the rod 62 has reached the end of its downward travel.

Figure 5:
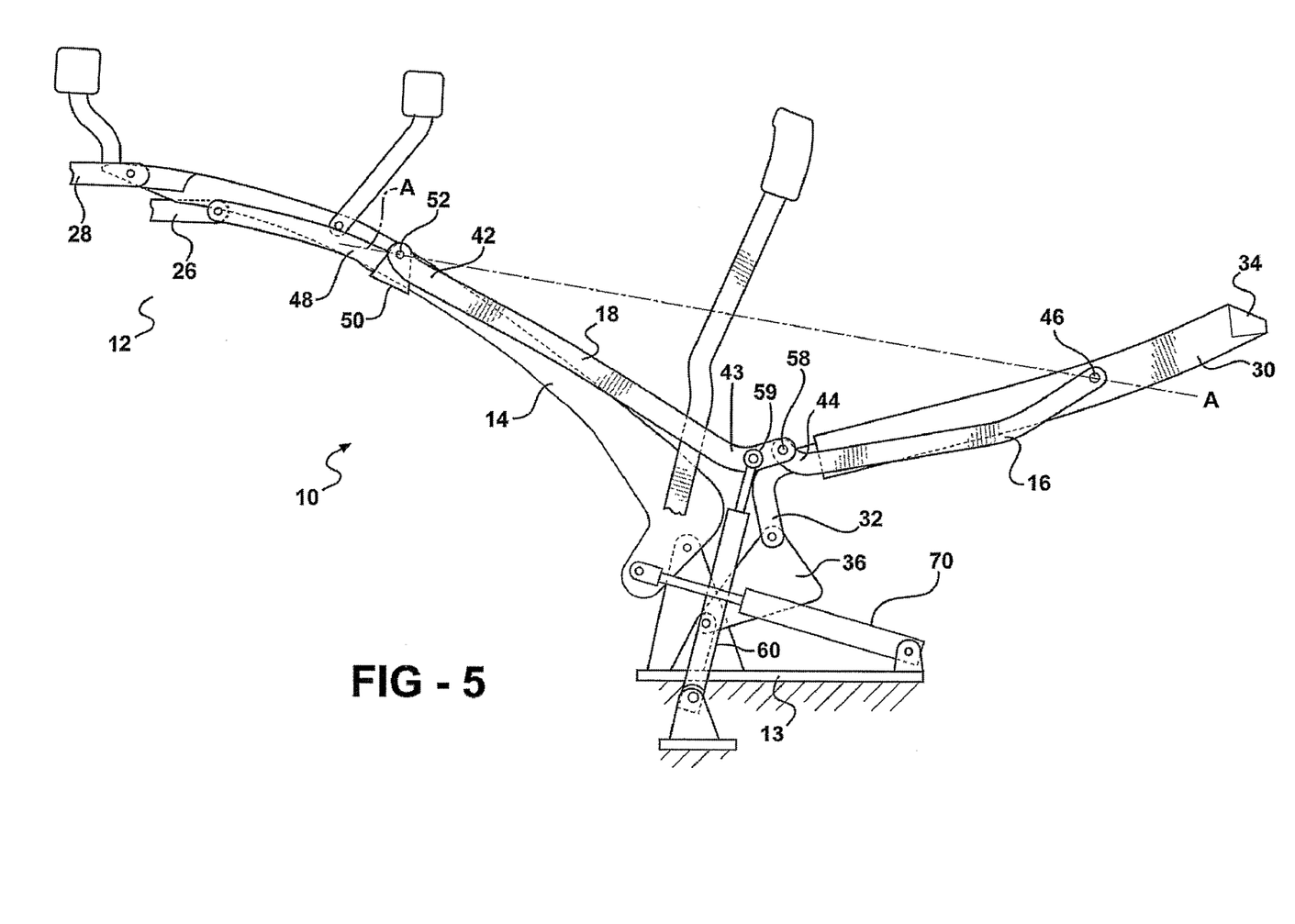
Figure 6:
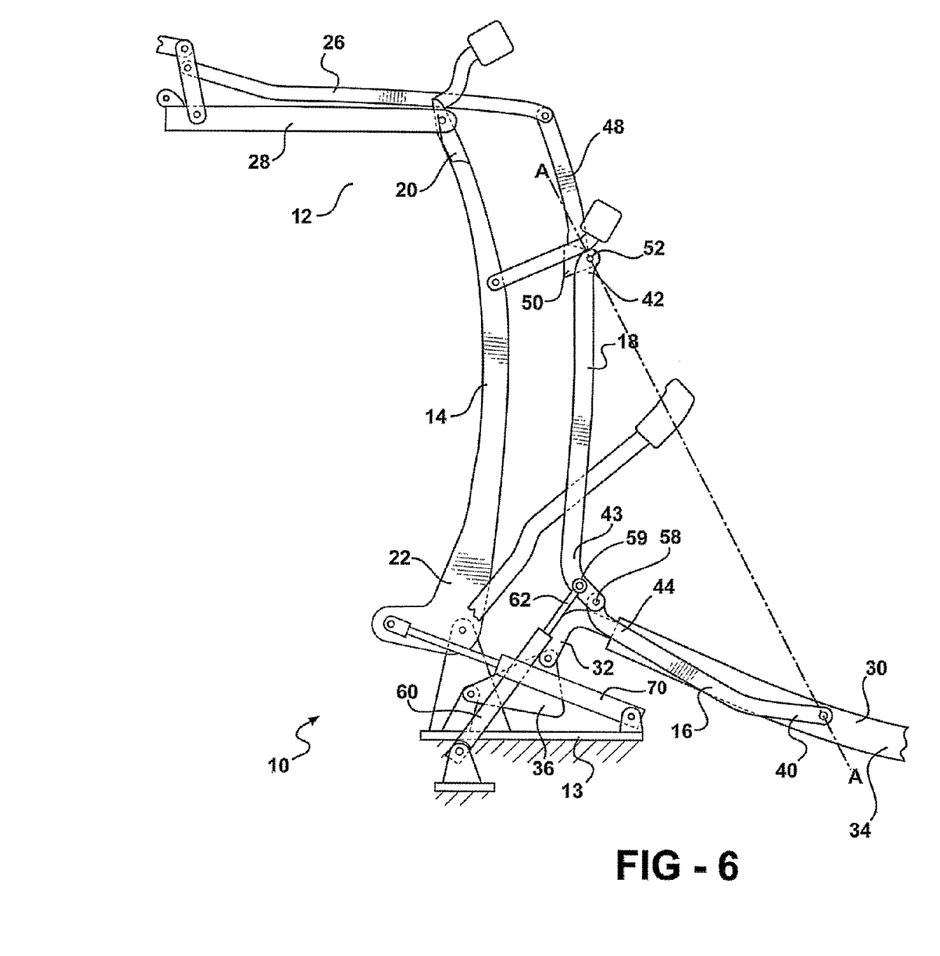
Figure 7:
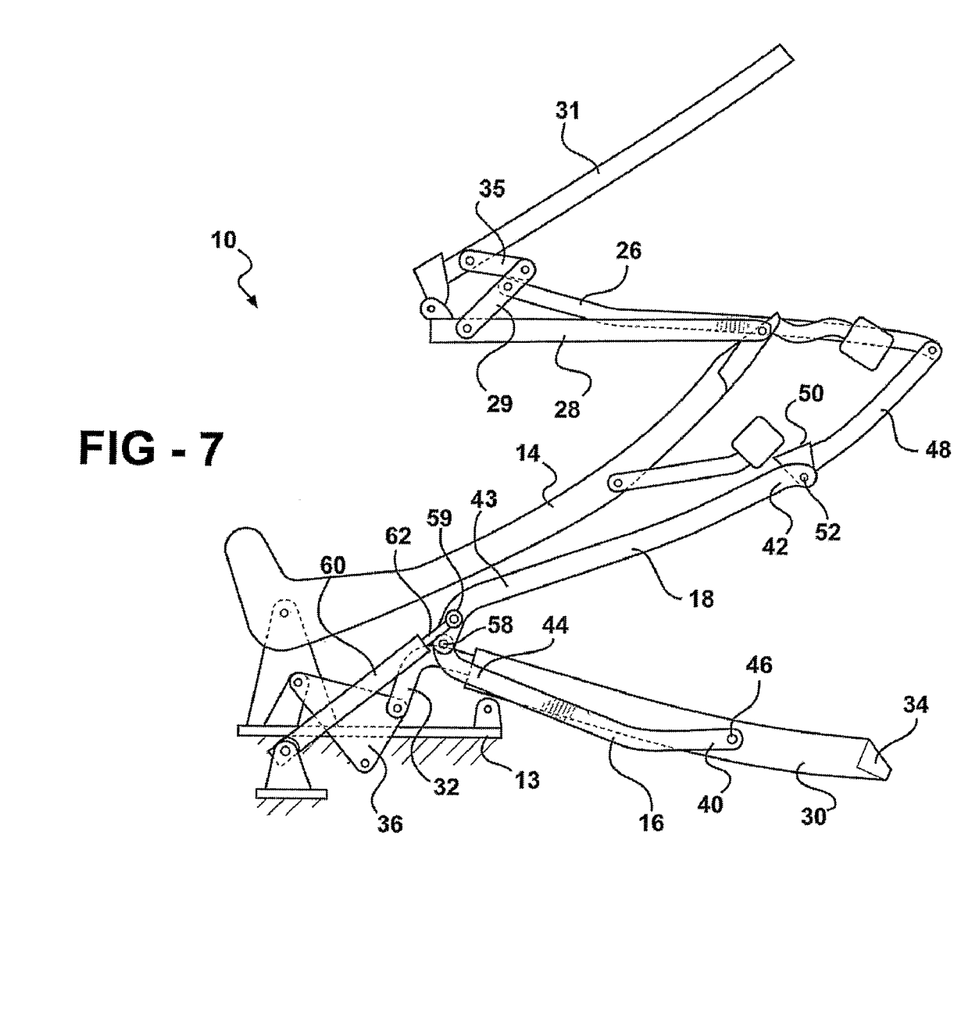

As shown in FIGS. 5-7, the third pivot 58 is now below the overcenter line A-A opposite from its original overcenter position in FIG. 1. The second actuator 70 drives the top 10 from the extended position to the retracted position. At the same time, the rear link 14 and the front overcenter link 18 pivot clockwise to the retracted position in FIG. 8.

The top 10 can be returned to the extended position in FIG. 1 by reversing the steps described above. The third pivot 58 is moved above the overcenter-line A-A to lock the rear link 14 and the rear bow 30 in the extended position. The close proximity between the third 58 and fourth 59 pivots and the generally orthogonal relationship between the actuator 60 and the overcenter line A-A provides a significant mechanical advantage over conventional designs in locking the linkage mechanism 12 and the rear bow 30 in the extended position.

The invention has been described in an illustrative manner. It is, therefore, to be understood that the terminology used is intended to be in the nature of words of description rather than of limitation. Many modifications and variations of the invention are possible in light of the above teachings. For example, the convertible top may be a hybrid design, wherein a front and/or middle portion of the top utilizes panels supported by the linkage mechanism and a rear portion utilizes a flexible roof cover interconnected to the rear bow. In this case, an overcenter linkage may still be coupled between the linkage mechanism and the rear bow in accordance with the aforementioned embodiment. Thus, within the scope of the appended claims, the invention may be practiced other than as specifically described.

I claim:

1. A retractable top for a motor vehicle having a passenger compartment and a storage space located behind the passenger compartment, wherein the top is movable between an extended position covering the passenger compartment and a retracted position disposed in the storage space, said top comprising:

a linkage mechanism pivotally coupled to the vehicle, the linkage mechanism including a rear link pivotally coupled to the vehicle;

a rear bow pivotally coupled to the vehicle;

a roof cover having a forward portion supported by the linkage mechanism and a rear portion interconnected with the rear bow;

an overcenter linkage having front and rear overcenter links that extend between the rear bow and the rear link of the linkage mechanism, the front and rear overcenter links each having opposite first and second ends, the first end of the rear overcenter link being pivotally coupled to the rear bow at a first pivot, the first end of the front overcenter link being pivotally coupled to the linkage mechanism via a coupling bracket at a second pivot, and the second ends of the front and rear overcenter links being pivotally coupled to each other at a third pivot, the overcenter linkage being movable to an overcenter position to retain the rear bow in the extended position; and an actuator directly pivotally coupled to the rear overcenter link adjacent the third pivot for actuating the overcenter linkage into and out of the overcenter position.

2. A retractable top as set forth in claim 1, wherein the linkage mechanism includes a middle rail pivotally coupled to the rear link and a front rail coupled to the middle rail by a four-bar linkage mechanism.

3. A retractable top as set forth in claim 2 including a coupling bracket pivotally interconnecting the front overcenter link to an intermediate link that is pivotally coupled to a link form the four-bar linkage mechanism.

4. A retractable top as set forth in claim 1, wherein the third pivot is movable to an overcenter position relative to an overcenter line extending between the first and second pivots, wherein the front and rear overcenter links retain the rear bow in the extended position.

5. A retractable top as set forth in claim 4, wherein the actuator acts along a line that is generally orthogonal to the overcenter line when the top is in the extended position.

6. A retractable top as set forth in claim 1, including a second actuator for moving the rear link between the extended and retracted positions.

7. A retractable top as set forth in claim 1, wherein the actuator is a hydraulic actuator.

8. A retractable top as set forth in claim 1, wherein the rear bow is directly pivotally coupled to a rocker that is directly pivotally coupled to the vehicle.

9. A retractable top as set forth in claim 1, wherein the actuator is a first actuator and a second actuator is provided for moving the linkage mechanism between the extended and retracted positions.

* * * * *